United States Patent
Baek et al.

(10) Patent No.: US 9,808,784 B2
(45) Date of Patent: Nov. 7, 2017

(54) MESOPOROUS CELLULAR FOAM IMPREGNATED WITH IRON-SUBSTITUTED HETEROPOLYACID, PREPARATION METHOD THEREFOR, AND CARBON DIOXIDE SEPARATION METHOD USING SAME

(71) Applicant: KOREA INSTITUTE OF ENERGY RESEARCH, Daejeon (KR)

(72) Inventors: Il Hyun Baek, Daejeon (KR); Pankaj Sharma, Gujarat (IN)

(73) Assignee: KOREA INSTITUTE OF ENERGY RESEARCH, Daejeon ( * ) Notice: Subject to any disclaimer, the term of this patent is extended or adjusted under 35 U.S.C. 154(b) by 178 days.

(21) Appl. No.: 14/904,658

(22) PCT Filed: Aug. 2, 2013

(86) PCT No.: PCT/KR2013/006988
§ 371 (c)(1),
(2) Date: Jan. 12, 2016

(87) PCT Pub. No.: WO2015/012426
PCT Pub. Date: Jan. 29, 2015

(65) Prior Publication Data
US 2016/0158727 A1     Jun. 9, 2016

(30) Foreign Application Priority Data
Jul. 24, 2013  (KR) .................. 10-2013-0087376

(51) Int. Cl.
*B01D 53/62*   (2006.01)
*C01G 49/00*   (2006.01)
(Continued)

(52) U.S. Cl.
CPC ........ *B01J 20/28045* (2013.01); *B01D 53/02* (2013.01); *B01D 53/04* (2013.01);
(Continued)

(58) Field of Classification Search
CPC .. B01D 53/02; B01D 53/04; B01D 2253/202; B01D 2253/204; B01D 2253/30;
(Continued)

(56) References Cited

U.S. PATENT DOCUMENTS

| 2006/0234859 | A1* | 10/2006 | Obana | B01J 23/652 |
| | | | | 502/213 |
| 2011/0217623 | A1* | 9/2011 | Jiang | H01M 8/1016 |
| | | | | 429/495 |
| 2015/0133705 | A1* | 5/2015 | Blommel | C07C 1/2078 |
| | | | | 585/322 |

FOREIGN PATENT DOCUMENTS

KR  10-2003-0018386 A   3/2003
KR  10-2007-0057853 A   6/2007
(Continued)

OTHER PUBLICATIONS

Chang-Keun Yi, "Advances of Carbon Capture Technology", KIC News, 2009, vol. 12, No. 1, pp. 29-42 and its summary English translation in 1 page.
(Continued)

*Primary Examiner* — Frank Lawrence
(74) *Attorney, Agent, or Firm* — Knobbe Martens Olson & Bear LLP

(57) ABSTRACT

Disclosed is a novel adsorbent having excellent adsorption durability and high adsorption efficiency while having improved durability, thereby improving a carbon dioxide (CO2) separation process. A mesoporous cellular foam impregnated with an iron (Fe)-substituted heteropolyacid includes a mesoporous cellular foam support and an Fe-substituted heteropolyacid, and the mesoporous cellular
(Continued)

foam impregnated with an Fe-substituted heteropolyacid has superior CO2 adsorption performance and exhibits excellent reproduction performance even after CO2 adsorption and desorption are performed several times through temperature changes, thereby enabling efficient and economical CO2 separation.

15 Claims, 3 Drawing Sheets

(51) Int. Cl.
| | |
|---|---|
| *B01J 20/28* | (2006.01) |
| *B01D 53/02* | (2006.01) |
| *B01J 20/06* | (2006.01) |
| *B01J 20/10* | (2006.01) |
| *B01J 20/32* | (2006.01) |
| *B01J 20/02* | (2006.01) |
| *B01D 53/04* | (2006.01) |
| *B01J 20/26* | (2006.01) |

(52) U.S. Cl.
CPC .......... *B01J 20/0229* (2013.01); *B01J 20/06* (2013.01); *B01J 20/10* (2013.01); *B01J 20/264* (2013.01); *B01J 20/28083* (2013.01); *B01J 20/3204* (2013.01); *B01J 20/3236* (2013.01); *C01G 49/009* (2013.01); *B01D 2253/202* (2013.01); *B01D 2253/204* (2013.01); *B01D 2253/30* (2013.01); *B01D 2257/504* (2013.01); *Y02C 10/04* (2013.01); *Y02C 10/08* (2013.01); *Y02P 20/152* (2015.11)

(58) Field of Classification Search
CPC ............. B01D 2257/504; C01G 49/009; B01J 20/0229; B01J 20/06; B01J 20/10; B01J 20/264; B01J 20/28045; B01J 20/28083; B01J 20/3204; B01J 20/3236; Y02C 10/04; Y02C 10/08; Y02P 20/152
See application file for complete search history.

(56) References Cited

FOREIGN PATENT DOCUMENTS

| | | |
|---|---|---|
| KR | 10-0879312 B1 | 1/2009 |
| KR | 10-2012-0004580 A | 1/2012 |

OTHER PUBLICATIONS

Sharma et al., "Mesoporous cellular foams supported Fe2.0SiW12O40: Synthesis, characterization and application to CO2 sorption", Powder Technology, Sep. 7, 2012, vol. 233, pp. 161-168.

Bhagiyalakshmi et al., "Synthesis of copper exchanged heteropolyacids supported on MCM-48 and its application for CO2 adsorption", Journal of Industrial and Engineering Chemistry, May 13, 2011, vol. 17, pp. 628-632.

International Search Report dated Feb. 10, 2014 of PCT/KR2013/006988 which is the parent application and its English translation—5 pages.

Written Opinion dated Feb. 10, 2014 of PCT/KR2013/006988 which is the parent application—5 pages.

* cited by examiner

[Fig. 1]
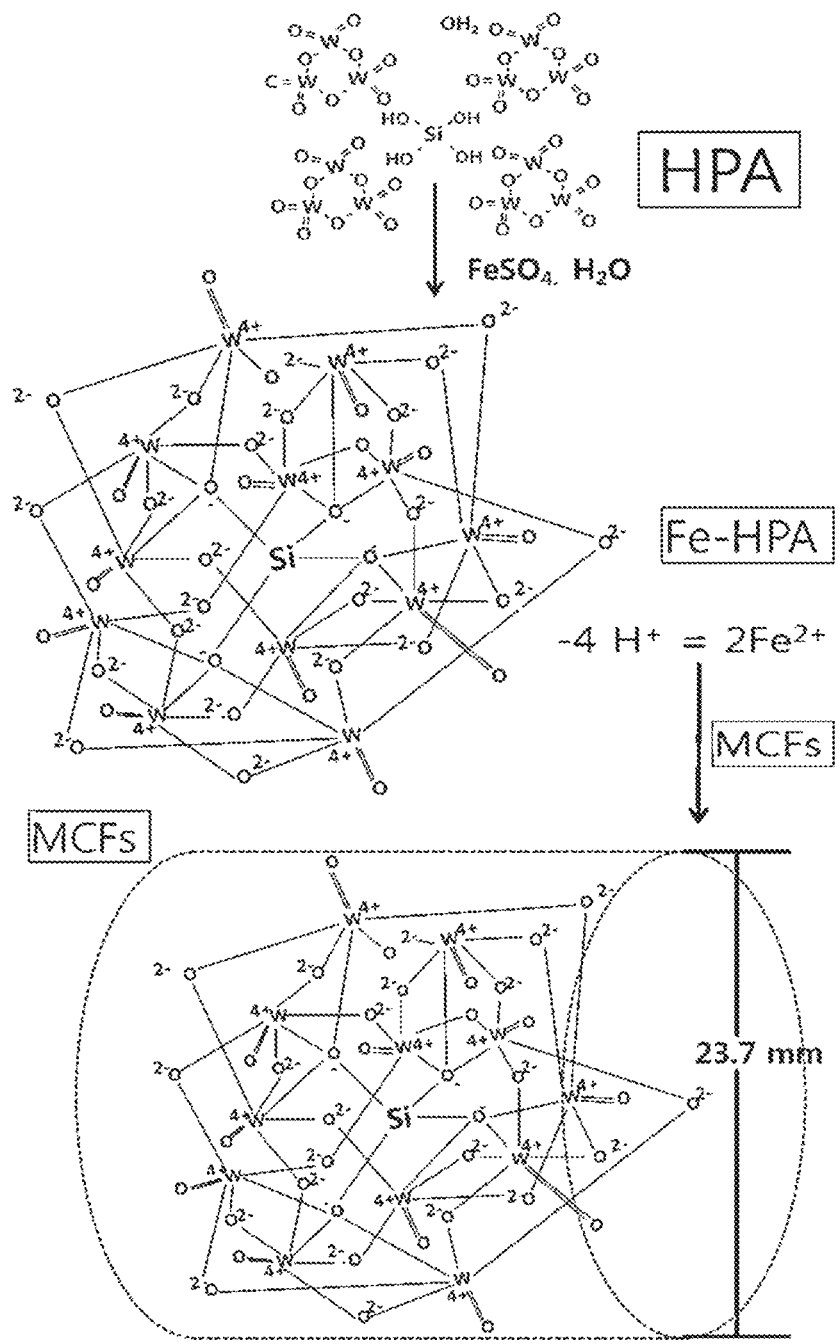

[Fig. 2]
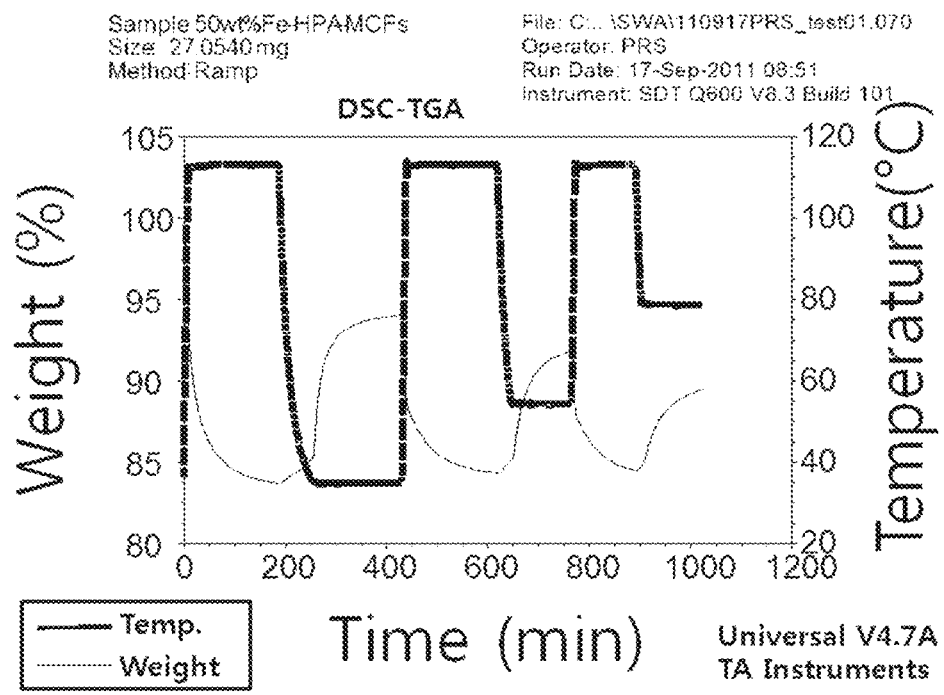
[Fig. 3]
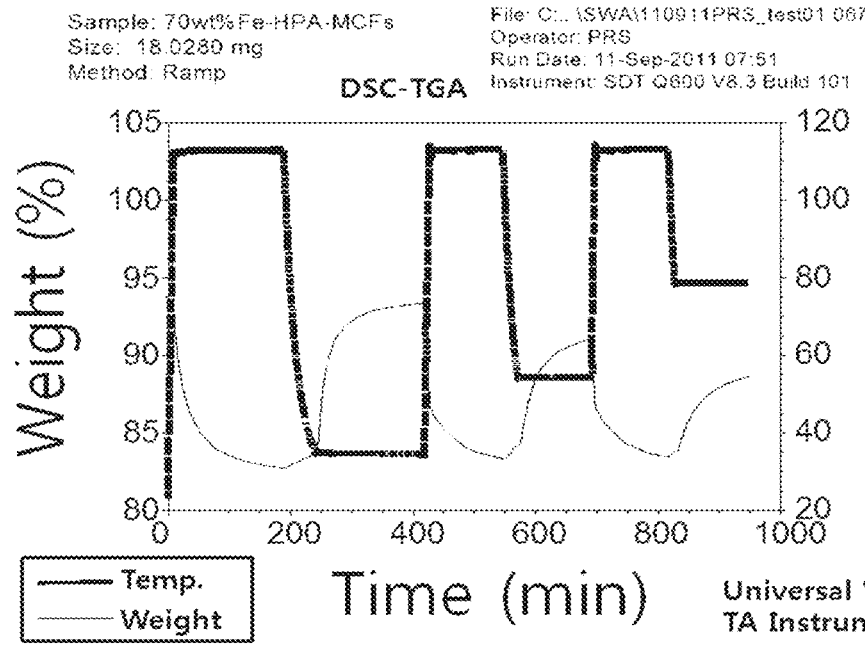

[Fig. 4]
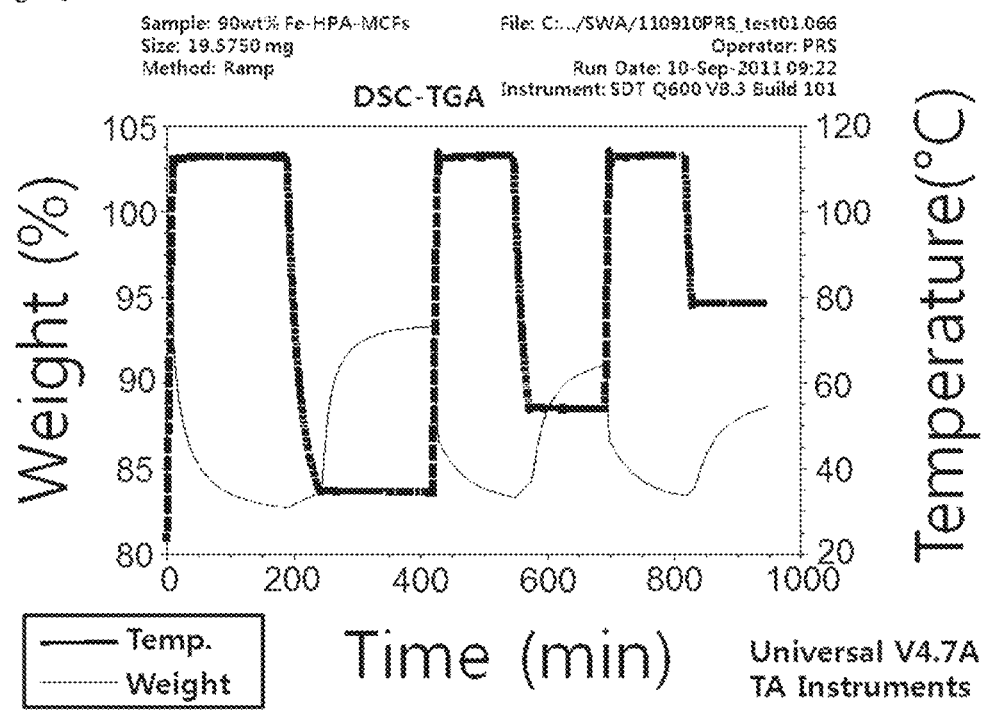
[Fig. 5]
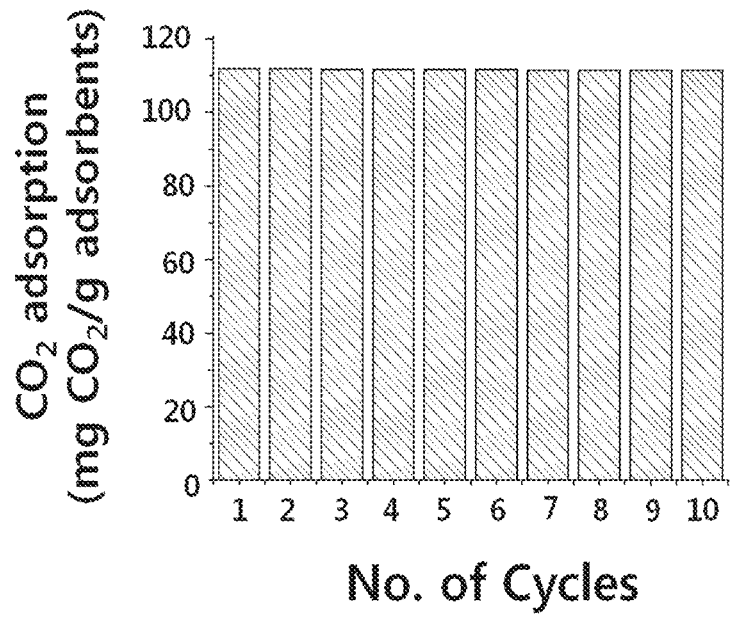

MESOPOROUS CELLULAR FOAM IMPREGNATED WITH IRON-SUBSTITUTED HETEROPOLYACID, PREPARATION METHOD THEREFOR, AND CARBON DIOXIDE SEPARATION METHOD USING SAME

TECHNICAL FIELD

The present disclosure relates to a carbon dioxide adsorbent, or, particularly, to a mesoporous cellular foam impregnated with an iron-substituted heteropolyacid, where the mesoporous cellular foam is a solid adsorbent that shows a different adsorption amount of carbon dioxide according to a temperature change, and a method of separating carbon dioxide using the mesoporous cellular foam.

BACKGROUND ART

Carbon dioxide capture and storage (CCS) is a technology that prevents isolating a massive amount of carbon dioxide discharged from sources such as power plants, steel plants, or cement plants using fossil fuels.

Among the CCS technologies, the carbon dioxide capture technique is a core technique that occupies about 70% to about 80% of the total cost, which is mainly classified into a postcombustion technology, a pre-combustion technology, and an oxy-fuel combustion technology (Current Status of Development in Carbon Dioxide Capturing Technology, LEE, Chang Geun, Prospect of Industrial Chemistry, Vol. 12, No. 1, 2009).

The post-combustion technology is a technique that removes carbon dioxide ($CO_2$) produced from fossil fuel by absorbing/adsorbing to or reacting with various separating media, and the pre-combustion technology separates carbon dioxide before combustion, which separates out carbon dioxide ($CO_2$) from among a gas mixture of carbon dioxide ($CO_2$) and hydrogen ($H_2$) after converting $CO_2$ and hydrogen by pre-treating the gas that is synthesized through a gasification process of fossil fuel, such as coal. Also, the oxy-fuel combustion technology uses only oxygen in the air when combusting fossil fuel, instead of using the atmosphere, and thus, the technology facilitates carbon dioxide ($CO_2$) capture. Among the technologies, the post-combustion technology has been the most common process currently being used to capture carbon dioxide.

As the post-combustion technology, which captures carbon dioxide in the fuel gas after combustion, a method of separating carbon dioxide by using an absorbent has been used as a common technique, but problems have been occurring such as an increase in driving energy and waste water generation due to use of liquid solution, and thus methods of capturing carbon dioxide using an absorbent that may resolve the problems have been developed.

The main flow of the methods of adsorbing, regenerating, and separating carbon dioxide by using an adsorbent has focused on improvement in performance of the absorbent and the process thereof. In particular, studies on increasing adsorption performance by combining chemical adsorbents using chemical characteristics and physical adsorbents using physical characteristics have been actively conducted.

Korean Patent No. 0879312 discloses a novel type of a carbon dioxide adsorbent that is prepared by impregnating zeolite with lithium hydroxide to improve adsorbent performance. However, the adsorbent has a low adsorbing ratio and a low durability of adsorption, as well as a low endurance. Thus, a carbon dioxide adsorbent having an improved adsorbing ratio, a high durability of adsorption, as well as a high endurance, is needed.

DETAILED DESCRIPTION OF THE INVENTION

Technical Problem

To address these drawbacks of the prior art, the present invention improves a process of separating carbon dioxide by providing a novel adsorbent with a high adsorbing efficiency as well as a high durability of adsorption and an increased endurance.

Technical Solution

To address the drawbacks of the prior art, the present inventors found that when a novel synthesis material is prepared by impregnating a mesoporous cellular foam support with an iron-substituted heteropolyacid, carbon dioxide adsorption performance of the material improved, and durability of the material improved as an adsorbent, thereby completing the present invention.

According to an aspect of the present disclosure, there is provided a mesoporous cellular foam impregnated with an iron-substituted heteropolyacid, the mesoporous cellular foam including a mesoporous cellular foam support; and an iron-substituted heteropolyacid.

In some embodiments of the mesoporous cellular foam impregnated with an iron-substituted heteropolyacid, a weight of the iron-substituted heteropolyacid may be about 50% to about 90% of a weight of the mesoporous cellular foam support.

In some embodiments of the mesoporous cellular foam impregnated with an iron-substituted heteropolyacid, a weight of the iron-substituted heteropolyacid may be about 70% of a weight of the mesoporous cellular foam support.

In some embodiments of the mesoporous cellular foam impregnated with an iron-substituted heteropolyacid, a molar ratio of ammonium ($NH_4$) to silicon (Si) in the mesoporous cellular foam support may be 6:1.

In some embodiments of the mesoporous cellular foam impregnated with an iron-substituted heteropolyacid, the iron-substituted heteropolyacid may have a molecular formula of $Fe_{2.0}SiW_{12}O_{40}$.

According to an aspect of the present disclosure, there is provided a method of preparing a mesoporous cellular foam impregnated with an iron-substituted heteropolyacid including preparing distilled water; dissolving 0.1 g of iron-substituted heteropolyacid (Fe-HPA) per 10 ml of the distilled water to prepare an aqueous solution; adding a mesoporous cellular foam support having a weight of a larger value than that of the iron-substituted heteropolyacid in the aqueous solution; stirring the aqueous solution to which the support is added; and drying the stirred aqueous solution at a temperature in a range of about 90° C. to about 110° C. for about 9 hours to about 11 hours.

In some embodiments of the method, a weight of the iron-substituted heteropolyacid may be about 50% to about 90% of a weight of the mesoporous cellular foam support.

In some embodiments of the method, a weight of the iron-substituted heteropolyacid may be about 70% of a weight of the mesoporous cellular foam support.

According to an aspect of the present disclosure, there is provided a method of separating carbon dioxide by using a mesoporous cellular foam impregnated with an iron-substituted heteropolyacid including adsorbing carbon dioxide by contacting a carbon dioxide-mixed gas to the mesoporous cellular foam impregnated with an iron-substituted heteropolyacid of any one of claims 1 to 5 at a temperature in a range of about 25° C. to about 75° C.; and desorbing carbon dioxide by placing the mesoporous cellular foam impregnated with an iron-substituted heteropolyacid which adsorbed carbon dioxide at a temperature in a range of about 100° C. to about 120° C.

In some embodiments of the method, the adsorbing of carbon dioxide may be performed at 50° C.

In some embodiments of the method, the desorbing of carbon dioxide may be performed at 110° C.

Advantageous Effects

According to one or more embodiments, a mesoporous cellular foam impregnated with an iron-substituted heteropolyacid has excellent carbon dioxide adsorbing ability and excellent regenerating ability even after repeated carbon dioxide adsorption and desorption, and thus when the adsorbent is used, carbon dioxide may be efficiently and economically separated.

DESCRIPTION OF THE DRAWINGS

FIG. 1 illustrates a process of an iron-substituted heteropolyacid being impregnated into a mesoporous cellular foam support;

FIG. 2 is a graph of 50 wt % Fe-HPA-MCFs showing carbon dioxide adsorption at 25° C., 50° C., and 75° C. and carbon dioxide adsorption and desorption at 110° C.;

FIG. 3 is a graph of 70 wt % Fe-HPA-MCFs showing carbon dioxide adsorption at 25° C., 50° C., and 75° C. and carbon dioxide adsorption and desorption at 110° C.;

FIG. 4 is a graph of 90 wt % Fe-HPA-MCFs showing carbon dioxide adsorption at 25° C., 50° C., and 75° C. and carbon dioxide adsorption and desorption at 110° C.; and FIG. 5 shows carbon dioxide adsorption performance of 70 wt % Fe-HPA-MCFs observed at 25° C. while repeating 10 cycles of adsorption and desorption.

EMBODIMENTS

Hereinafter, the inventive concept will be described in detail by explaining embodiments of the inventive concept with reference to the attached drawings. In the description of the embodiments, certain detailed explanations of related art are omitted when it is deemed that they may unnecessarily obscure the essence of the invention.

According to an embodiment of the present invention, a mesoporous cellular foam with large pores is impregnated with an iron-substituted heteropolyacid that has a chemical absorptivity with respect to carbon dioxide so that the two materials compensate adsorbing abilities to maximize carbon dioxide adsorbing ability.

FIG. 1 illustrates a process of an iron-substituted heteropolyacid (hereinafter, also referred to as "Fe-HPA") being impregnated into a mesoporous cellular foam (hereinafter, also referred to as "MCF") support, and thus provides an iron-substituted heteropolyacid impregnated mesoporous cellular foam (hereinafter, also referred to as "Fe-HPA-MCF"). The process will be described as follows.

MCF Support (MCFs) Synthesis

In one embodiment of the present invention, a solution was prepared by dissolving 2.0 g of poly(ethylene glycol)-blockpoly(propyleneglycol)-blockpoly(ethyleneglycol) (P123) in 75 ml of hydrochloric acid (HCl) at a concentration of 1.6 M at room temperature. 5.0 g of 1,3,5-trimethyl benzene (TMB) and 46 mg of ammonium fluoride ($NH_4F$) were added to the solution, and the solution was rapidly stirred at 40° C. for 2 hours. After stirring, 4.4 g of tetra ethyl ortho silicate (TEOS) was added thereto and stirred for 24 hours. Then, the milky mixture was placed in a pressurized reactor, and a temperature therein was maintained at 100° C. for 24 hours. The synthesized resultant was filtered and dried at room temperature for 48 hours. The dried sample was sintered in the air at 550° C. for 6 hours, a template of the sample was then removed, and the sintered sample was used as MCFs. A molar ratio of ammonium ($NH_4$) and silicon (Si) of the synthesized MCFs was 6:1.

Synthesis of Iron (Fe)-Substituted Heteropolyacid (HPA) (Fe-HPA)

In one embodiment of the present invention, 0.18 g of barium hydroxide ($Ba(OH)_2 \cdot 8H_2O$) was added to an aqueous solution prepared by dissolving 2.0 g of silicotungsticacid ($H_4SiM_2O_{40}$) in 5 ml of distilled water. Then, 0.16 g of iron sulfate ($FeSO_4 \cdot 7H_2O$) was added to remove barium (Ba) in the form of barium sulfate ($BaSO_4$) and substituted with iron. Then the solution was evaporated by using nitrogen bubbling that penetrated through the solution to extract an iron-substituted heteropolyacid (Fe-HPA, $Fe_{2.0}SiW_{12}O_{40}$), which is a composite.

Synthesis of Fe-HPA-MCFs.

A predetermined amount of the iron-substituted heteropolyacid (Fe-HPA) extracted from the process was dissolved in distilled water, and an amount of MCFs at a weight that is higher than a weight of the iron-substituted heteropolyacid was added thereto. In one embodiment of the present invention, a weight ratio of the iron-substituted heteropolyacid (Fe-HPA) to MCFs was 0.5. Also, in some embodiments of the present invention, the weight ratio of the iron-substituted heteropolyacid to MCFs may be 0.7 or 0.9. A slurry formed by the reaction was stirred and dried. In one embodiment of the present invention, after 1 hour of stirring the slurry, the resultant was dried at a temperature of 100° C. for 10 hours in an oven.

Example 1. 50 wt % Fe-HPA-MCFs 0.5 g of the iron-substituted heteropolyacid (Fe-HPA) extracted from the process was dissolved in 50 ml of distilled water, and 1.0 g of MCFs was added thereto. A slurry formed by the reaction was stirred for 1 hour, and dried at a temperature of 100° C. for 10 hours in an oven. The resultant was referred to as 50 wt % Fe-HPA-MCFs.

Adsorption performance of the 50 wt % Fe-HPA-MCFs was measured at a temperature of 25° C., 50° C., or 75° C., and desorption performance of the 50 wt % Fe-HPA-MCFs was measured at a temperature of 110° C. The adsorption-desorption measurement was performed by using a heat-weight analyzer N-1000, where the adsorption was performed in the atmosphere at a temperature of 25° C., 50° C., or 75° C. using high purity carbon dioxide (15.1%), and the desorption was performed while flowing nitrogen gas at a temperature of 110° C. A continuous carbon dioxide adsorption-desorption profile was obtained by automatic alternation of heating, cooling, and carbon dioxide (15.1%) and nitrogen ($N_2$).

FIG. 2 is a graph of 50 wt % Fe-HPA-MCFs showing carbon dioxide adsorption at 25° C., 50° C., and 75° C. and carbon dioxide adsorption and desorption at 110° C. When a weight of the sample in the initial state is 100 wt %, the weight of the sample decreases as a nitrogen gas is flowed thereto for 200 minutes at 110° C., and this is because water molecules and moisture adsorbed in the sample evaporate. After decreasing a temperature of the sample for about 20 minutes, when carbon dioxide gas is flowed thereto, a weight of the sample increases, but after about 180 minutes, an increase of the weight of the sample reaches its saturation value, and this denotes that an absorption amount of carbon dioxide of the sample has increased and saturated. When nitrogen gas is flowed to the carbon dioxide-saturated 50 wt % Fe-HPA-MCFs and maintained at 110° C. for 2 hours, a weight of the sample decreases again, and this is a process when the adsorbed carbon dioxide starts to desorb. The carbon dioxide-desorbed 50 wt % Fe-HPA-MCFs is again cooled to a temperature of 50° C. in a carbon dioxide atmosphere and maintained for 2 hours so that carbon dioxide to adsorb, and thus a weight of the sample increases. Subsequently, carbon dioxide is desorbed from the sample by maintaining a temperature at 110° C. for 2 hours in a nitrogen atmosphere, and then a temperature was maintained at 75° C. for 2 hours in a carbon dioxide atmosphere.

As a result, it may be known that an adsorption amount of carbon dioxide decreases as a temperature increases from 25° C. to 50° C. and to 75° C., and the adsorption amount of carbon dioxide was constantly the lowest value at 110° C. Therefore, 50 wt % Fe-HPA-MCFs may be used as an absorbent for separating carbon dioxide that adsorbs carbon dioxide at a low temperature between 25° C. and 75° C. at which an adsorption amount is a certain value or higher and that desorbs carbon dioxide at a high temperature of 110° C.

An amount of carbon dioxide adsorbed by the 50 wt % Fe-HPA-MCFs was 99.3 mg at 25° C., 76.4 mg at 50° C., and 52.2 mg at 75° C. per 1 g of Fe-HPA-MCFs.

Example 2. 70 wt % Fe-HPA-MCFs 0.7 g of the iron-substituted heteropolyacid (Fe-HPA) was dissolved in 70 ml of distilled water, and 1.0 g of MCFs was added thereto. A slurry formed by the reaction was stirred for 1 hour, and dried at a temperature of 100° C. for 10 hours in an oven. The resultant was referred to as 70 wt % Fe-HPA-MCFs.

Adsorption performance of the 70 wt % Fe-HPA-MCFs was measured at a temperature of 25° C., 50° C., or 75° C., and desorption performance of the 70 wt % Fe-HPA-MCFs was measured at a temperature of 110° C. The adsorption-desorption measurement was performed by using a heat-weight analyzer N-1000, available from SCINO, where the adsorption was performed in the atmosphere at a temperature of 25° C., 50° C., or 75° C. using high purity carbon dioxide (15.1%), and the desorption was performed while flowing nitrogen gas at a temperature of 110° C. A continuous carbon dioxide adsorption-desorption profile was obtained by automatic alternation of heating, cooling, and carbon dioxide (15.1%) and nitrogen ($N_2$).

Adsorption performance of the 70 wt % Fe-HPA-MCFs was measured at a temperature of 25° C., 50° C., or 75° C., and desorption performance of the 70 wt % Fe-HPA-MCFs was measured at a temperature of 110° C. FIG. 3 is a graph of 70 wt % Fe-HPA-MCFs showing carbon dioxide adsorption at 25° C., 50° C., and 75° C. and carbon dioxide adsorption and desorption at 110° C. When a weight of the sample in the initial state is 100 wt %, the weight of the sample decreases as a nitrogen gas is flowed thereto for 200 minutes at 110° C., and this is because water molecules and moisture adsorbed in the sample evaporate. After decreasing a temperature of the sample for about 20 minutes, when carbon dioxide gas is flowed thereto, a weight of the sample increases, but after about 180 minutes, an increase of the weight of the sample reaches its saturation value, and this denotes that an absorption amount of carbon dioxide of the sample has increased and saturated. When nitrogen gas is flowed to the carbon dioxide-saturated 70 wt % Fe-HPA-MCFs and maintained at 110° C. for 2 hours, a weight of the sample decreases again, and this is a process when the adsorbed carbon dioxide starts to desorb. The carbon dioxide-desorbed 70 wt % Fe-HPA-MCFs is again cooled to a temperature of 50° C. in a carbon dioxide atmosphere and maintained for 2 hours so that carbon dioxide to adsorb, and thus a weight of the sample increases. Subsequently, carbon dioxide is desorbed from the sample by maintaining a temperature at 110° C. for 2 hours in a nitrogen atmosphere, and then a temperature was maintained at 75° C. for 2 hours in a carbon dioxide atmosphere.

As a result, it may be known that an adsorption amount of carbon dioxide decreases as a temperature increases from 25° C. to 50° C. and to 75° C., and the adsorption amount of carbon dioxide was constantly the lowest value at 110° C. Therefore, 70 wt % Fe-HPA-MCFs may be used as an absorbent for separating carbon dioxide that adsorbs carbon dioxide at a low temperature between 25° C. and 75° C. at which an adsorption amount is a certain value or higher and that desorbs carbon dioxide at a high temperature of 110° C.

An amount of carbon dioxide adsorbed by the 70 wt % Fe-HPA-MCFs was 111.8 mg at 25° C., 77.9 mg at 50° C., and 55.5 mg at 75° C. per 1 g of Fe-HPA-MCFs.

Example 3. 90 wt % Fe-HPA-MCFs 0.9 g of the iron-substituted heteropolyacid (Fe-HPA) was dissolved in 90 ml of distilled water, and 1.0 g of MCFs was added thereto. A slurry formed by the reaction was stirred for 1 hour, and dried at a temperature of 100° C. for 10 hours in an oven. The resultant was referred to as 90 wt % Fe-HPA-MCFs.

Adsorption performance of the 90 wt % Fe-HPA-MCFs was measured at a temperature of 25° C., 50° C., or 75° C., and desorption performance of the 70 wt % Fe-HPA-MCFs was measured at a temperature of 110° C. The adsorption-desorption measurement was performed by using a heat-weight analyzer N-1000, available from SCINO, where the adsorption was performed in the atmosphere at a temperature of 25° C., 50° C., or 75° C. using high purity carbon dioxide (15.1%), and the desorption was performed while flowing nitrogen gas at a temperature of 110° C. A continuous carbon dioxide adsorption-desorption profile was obtained by automatic alternation of heating, cooling, and carbon dioxide (15.1%) and nitrogen ($N_2$).

FIG. 4 is a graph of 90 wt % Fe-HPA-MCFs showing carbon dioxide adsorption at 25° C., 50° C., and 75° C. and carbon dioxide adsorption and desorption at 110° C. When a weight of the sample in the initial state is 100 wt %, the weight of the sample decreases as a nitrogen gas is flowed thereto for 200 minutes at 110° C., and this is because water molecules and moisture adsorbed in the sample evaporate. After decreasing a temperature of the sample for about 20 minutes, when carbon dioxide gas is flowed thereto, a weight of the sample increases, but after about 180 minutes, an increase of the weight of the sample reaches its saturation value, and this denotes that an absorption amount of carbon dioxide of the sample has increased and saturated. When nitrogen gas is flowed to the carbon dioxide-saturated 90 wt % Fe-HPA-MCFs and maintained at 110° C. for 2 hours, a weight of the sample decreases again, and this is a process when the adsorbed carbon dioxide starts to desorb. The carbon dioxide-desorbed 90 wt % Fe-HPA-MCFs is again cooled to a temperature of 50° C. in a carbon dioxide atmosphere and maintained for 2 hours so that carbon dioxide to adsorb, and thus a weight of the sample increases. Subsequently, carbon dioxide is desorbed from the sample by maintaining a temperature at 110° C. for 2 hours in a nitrogen atmosphere, and then a temperature was maintained at 75° C. for 2 hours in a carbon dioxide atmosphere.

As a result, it may be known that an adsorption amount of carbon dioxide decreases as a temperature increases from 25° C. to 50° C. and to 75° C., and the adsorption amount of carbon dioxide was constantly the lowest value at 110° C. Therefore, 90 wt % Fe-HPA-MCFs may be used as an absorbent for separating carbon dioxide that adsorbs carbon dioxide at a low temperature between 25° C. and 75° C. at which an adsorption amount is a certain value or higher and that desorbs carbon dioxide at a high temperature of 110° C.

An amount of carbon dioxide adsorbed by the 90 wt % Fe-HPA-MCFs was 112 mg at 25° C., 78.8 mg at 50° C., and 55.9 mg at 75° C. per 1 g of Fe-HPA-MCFs.

In this regard, it was confirmed that when a weight ratio of Fe-HPA in a Fe-HPA-MCFs composition increases, an adsorption amount increases, and as a temperature decreases, an adsorption amount increases. That is, a process that adsorbs carbon dioxide at a temperature of 25° C. and desorbs carbon dioxide at a temperature of 110° C. is relatively efficient.

Example 4. Regenerating Performance of 70 wt % Fe-HPA-MCFs

FIG. 5 shows an adsorption amount of carbon dioxide according to the cycle number of carbon dioxide adsorption and desorption by using 70 wt % Fe-HPA-MCFs. 10 cycles of adsorbing carbon dioxide at 25° C. and desorbing carbon dioxide at 110° C. were performed, and the adsorption ability of the absorbent, 70 wt % Fe-HPA-MCFs, almost did not change, and thus regenerating performance of the absorbent was confirmed excellent.

Although the mesoporous cellular foam impregnated with an iron-substituted heteropolyacid may have different carbon dioxide adsorbing ability according to its composition ratio and temperature, a carbon dioxide adsorption performance of the mesoporous cellular foam impregnated with an iron-substituted heteropolyacid in general is excellent within an adsorption temperature range of about 25° C. to about 75° C., and a carbon dioxide desorption performance of the mesoporous cellular foam at 110° C. is the same with the initial state, which showed excellent regenerating ability, and thus proved performance to be used as an excellent novel carbon dioxide adsorbent.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

The invention claimed is:

1. A mesoporous cellular foam impregnated with an iron-substituted heteropolyacid, the mesoporous cellular foam comprising:
   a mesoporous cellular foam support; and
   an iron-substituted heteropolyacid.

2. The mesoporous cellular foam of claim 1, wherein a weight of the iron-substituted heteropolyacid is about 50% to about 90% of a weight of the mesoporous cellular foam support.

3. The mesoporous cellular foam of claim 1, wherein a weight of the iron-substituted heteropolyacid is about 70% of a weight of the mesoporous cellular foam support.

4. The mesoporous cellular foam of claim 1, wherein a molar ratio of ammonium ($NH_4$) to silicon (Si) in the mesoporous cellular foam support is 6:1.

5. The mesoporous cellular foam of claim 1, wherein the molecular formula of the iron-substituted heteropolyacid is $Fe_{2.0}SiW_{12}O_{40}$.

6. A method of preparing a mesoporous cellular foam impregnated with an iron-substituted heteropolyacid, the method comprising:
   providing distilled water;
   dissolving 0.1 g of iron-substituted heteropolyacid (Fe-HPA) per 10 ml of the distilled water to prepare an aqueous solution;
   adding a mesoporous cellular foam support having a weight of a larger value than that of the iron-substituted heteropolyacid in the aqueous solution;
   stirring the aqueous solution to which the support is added; and
   drying the stirred aqueous solution at a temperature in a range of about 90° C. to about 110° C. for about 9 hours to about 11 hours.

7. The method of claim 6, wherein a weight of the iron-substituted heteropolyacid is about 50% to about 90% of a weight of the mesoporous cellular foam support.

8. The method of claim 6, wherein a weight of the iron-substituted heteropolyacid is about 70% of the mesoporous cellular foam support.

9. A method of separating carbon dioxide by using a mesoporous cellular foam impregnated with an iron-substituted heteropolyacid, the method comprising:
   adsorbing carbon dioxide by contacting a carbon dioxide-mixed gas with the mesoporous cellular foam of claim 1 at a temperature in a range of about 25° C. to about 75° C.; and
   desorbing carbon dioxide by placing the mesoporous cellular foam impregnated with an iron-substituted heteropolyacid which adsorbed carbon dioxide at a temperature in a range of about 100° C. to about 120° C.

10. The method of claim 9, wherein the adsorbing carbon dioxide is performed at 50° C.

11. The method of claim 9, wherein the desorbing carbon dioxide is performed at 110° C.

12. The method of claim 9, wherein a weight of the iron-substituted heteropolyacid of the mesoporous cellular foam is about 50% to about 90% of a weight of the mesoporous cellular foam support of the mesoporous cellular foam.

13. The method of claim 9, wherein a weight of the iron-substituted heteropolyacid of the mesoporous cellular foam is about 70% of a weight of the mesoporous cellular foam support of the mesoporous cellular foam.

14. The method of claim 9, wherein a molar ratio of ammonium ($NH_4$) to silicon (Si) in the mesoporous cellular foam support of the mesoporous cellular foam is 6:1.

15. The method of claim 9, wherein the molecular formula of the iron-substituted heteropolyacid of the mesoporous cellular foam is $Fe_{2.0}SiW_{12}O_{40}$.

* * * * *